("12") United States Patent
Lee et al.

(10) Patent No.: US 12,306,635 B2
(45) Date of Patent: May 20, 2025

(54) METHOD OF ALERTING TO STATIONARY OBJECTS FOR VEHICLE

(71) Applicant: METAL INDUSTRIES RESEARCH & DEVELOPMENT CENTRE, Kaohsiung (TW)

(72) Inventors: Tsung-Han Lee, Kaohsiung (TW); Jinn-Feng Jiang, Kaohsiung (TW); Shih-Chun Hsu, Kaohsiung (TW); Tsu-Kun Chang, Kaohsiung (TW); Cheng-Tai Lei, Kaohsiung (TW); Hung-Yuan Wei, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 214 days.

(21) Appl. No.: 18/347,780

(22) Filed: Jul. 6, 2023

(65) Prior Publication Data
US 2024/0176353 A1 May 30, 2024

(30) Foreign Application Priority Data
Nov. 29, 2022 (TW) .................................. 111145724

(51) Int. Cl.
G01S 17/93 (2020.01)
B60R 21/0134 (2006.01)
G05D 1/00 (2006.01)

(52) U.S. Cl.
CPC ....... G05D 1/0242 (2013.01); B60R 21/0134 (2013.01); G01S 17/93 (2013.01); G05D 1/0246 (2013.01)

(58) Field of Classification Search
CPC ....... G06T 17/00; G01S 17/93; G01S 17/931; B60R 21/013
See application file for complete search history.

(56) References Cited

U.S. PATENT DOCUMENTS

2016/0104048 A1    4/2016  Stein et al.
2018/0165531 A1*   6/2018  Sathyanarayana ... G07C 5/0866
2020/0211226 A1*   7/2020  Kundu ................. G06V 20/582

FOREIGN PATENT DOCUMENTS

JP    2008-015920 A    1/2008
JP    2019-533609 A    11/2019

* cited by examiner

Primary Examiner — Benyam Haile
(74) Attorney, Agent, or Firm — WPAT, PC

(57) ABSTRACT

The present invention provides a method of alerting to stationary objects for vehicle. When a vehicle moves at a first speed, an optical scanning device, an infrared image extraction device, and an image extraction device extract a first optical scanning image, a first infrared image, and a first ambient image of the ambiance on one side of the vehicle. According to the fusion algorithm and the optical flow method, the first obstacle information of the first obstacle in the first image will be given. According to the location information of the first obstacle, the vehicle computer judges and generates an alert message when the relative distance is smaller than a distance threshold value and the obstacle volume is greater than a volume threshold value.

6 Claims, 6 Drawing Sheets

METHOD OF ALERTING TO STATIONARY OBJECTS FOR VEHICLE

BACKGROUND OF THE INVENTION

The advanced driver assistance systems (ADAS) are developed for assisting drivers and can be divided into three major parts: vehicle sensors, vehicle processors, and actuators. ADAS uses vehicle sensors to sense the signals outside the vehicle. In addition to millimeter-wave radars and lidars, vehicle sensors also include thermal and pressure sensors. The vehicle sensors transmit the sensing data to the vehicle processors, for example, the electronic control unit (ECU). Then the latter can generate alert information for drivers according to the sensing data for avoiding danger.

Furthermore, when the driver is not able to respond, the vehicle sensors will intervene the driver's driving behavior and enable the actuators to slow down the vehicle, do an emergency brake, or change the direction of the vehicle for protecting the driver.

In addition, to protect the driver, the radar detection technology is developed for detecting the surroundings of the vehicle. Unfortunately, the radar cannot tell the object around the vehicle is a fixed obstacle or a moving object. When an object not influencing the vehicle is approximate, the alert unit is still activated to launch alert messages frequently. These frequent alerts annoy the driver.

Although the detection of surrounding obstacles for vehicles is improved much for monitoring, during the movement of a vehicle, in addition to the danger caused by other vehicles, there still are things influencing the safety of the vehicle. For example, pedestrians, animals, and moving objects can be regarded as the obstacles for the vehicle. All of them will induce emergency situations when the vehicle is moving. The influence is most significant in crowded streets in cities.

Under emergency situations, there are dashcams for recording color images. Nonetheless, it is not a satisfactory solution to allow accidents happen and judge afterwards. A better solution is to let derivers avoid emergency situations in advance. Besides, current dashcams are installed on the front and rear sides of a vehicle. There are still blind spots on lateral sides. Thereby, it is required to integrate lateral recording and detecting techniques for further assisting drivers avoiding lateral blind spots. Moreover, according to the detection of lateral blind spots, it is required to predict potential danger and notify the driver for protection.

Current vehicles can detect potential danger, for example, while driving at the crossroads, or even while parking. Unfortunately, current detection methods are mostly applied to crossroads, adjacent lanes, and parking scenarios; they are limited to detecting mobile objects relative to the vehicle, instead of stationary obstacles such as safety islands or stationary motorcyclists. Consequently, when a vehicle is moving, it is possible to have accidents owing to misjudgment of stationary obstacles.

Accordingly, how to judge stationary obstacles accurately and correctly for avoiding fender-benders with obstacles has become the major challenges in the field.

SUMMARY OF THE INVENTION

An objective of the present invention to provide a method of alerting to stationary objects for vehicle. Scan the objects on one side of a vehicle to acquire the corresponding object images and filter the object images to get the filtered images that influences the vehicle. According to the speeds of the corresponding objects and the vehicle and the distances therebetween, generate an alert message to the user so that the user can do precautions in advance for avoiding danger.

To achieve the above objective, the present invention provides a method of alerting to stationary objects for vehicle. The method is applicable to a vehicle, which includes a vehicle computer, an optical scanning device, an infrared image extraction device, and an image extraction device. The vehicle computer is connected electrically to the optical scanning device, the infrared image extraction device, and the image extraction device. The vehicle computer executes the following steps of: when the vehicle moves, the optical scanning device, the infrared image extraction device, and the image extraction device extracting a first optical scanning image, a first infrared image, and a first ambient image of an ambiance on one side of the vehicle; the vehicle computer receiving and combining the first optical scanning image, the first infrared image, and the first ambient image according to a fusion algorithm to give a first image; the vehicle computer analyzing and acquiring the first obstacle information of a first obstacle in the first image according to an image optical flow method, where the first obstacle information includes a relative distance to the vehicle and an obstacle volume of the first obstacle; and when the relative distance is smaller than a distance threshold value and the obstacle volume is greater than a volume threshold value, the vehicle computer labeling a real obstacle on a display unit of the vehicle computer and generating an alert message.

According to an embodiment of the present invention, in the step of the vehicle computer receiving and combining the first optical scanning image, the first infrared image, and the first ambient image according to a fusion algorithm to give a first image, the vehicle computer includes a processing unit; the processing unit includes an image processing program; and the image processing program is used for executing the fusion algorithm and the image optical flow method.

According to an embodiment of the present invention, in the step of the vehicle computer analyzing and acquiring the first obstacle information of a first obstacle in the first image according to an image optical flow method, where the first obstacle information includes a relative distance to the vehicle and an obstacle volume of the first obstacle in the first image, the vehicle computer further executes the steps of: the vehicle classifying the real obstacle according to the obstacle volume; and when the obstacle volume is smaller than the volume threshold value, the vehicle computer judging the real obstacle an invalid obstacle.

According to an embodiment of the present invention, the alert message is a voice message or/and an image message.

According to an embodiment of the present invention, in the step of when the relative distance is smaller than a distance threshold value and the obstacle volume is greater than a volume threshold value, the vehicle computer labeling a real obstacle on a display unit of the vehicle computer and generating an alert message, the volume threshold value is smaller than 400 square centimeters.

According to an embodiment of the present invention, in the step of when the relative distance is smaller than a distance threshold value and the obstacle volume is greater than a volume threshold value, the vehicle computer labeling a real obstacle on a display unit of the vehicle computer and generating an alert message, the distance threshold value is smaller than 200 meters.

DETAILED DESCRIPTION OF THE INVENTION

In order to make the structure and characteristics as well as the effectiveness of the present invention to be further understood and recognized, the detailed description of the present invention is provided as follows along with embodiments and accompanying figures.

The detection methods according to the prior art are mostly applied to crossroads, adjacent lanes, and parking scenarios; they are limited to detecting mobile objects relative to the vehicle, instead of stationary obstacles such as safety islands or stationary motorcyclists. Consequently, when a vehicle is moving, it is possible to have accidents owing to misjudgment of stationary obstacles.

To solve the problem of inability in alerting stationary obstacles according to the prior art, the present invention provides a method of alerting to stationary objects for vehicle. The method scans the objects on one side of a vehicle to acquire the corresponding object images and filter the object images to get the filtered images that influences the vehicle. According to the speeds of the corresponding objects and the vehicle and the distances therebetween, the method generates an alert message to the user so that the user can do precautions in advance for avoiding danger.

In the following description, various embodiments of the present invention are described using figures for describing the present invention in detail. Nonetheless, the concepts of the present invention can be embodied by various forms. Those embodiments are not used to limit the scope and range of the present invention.

Figure 1A:
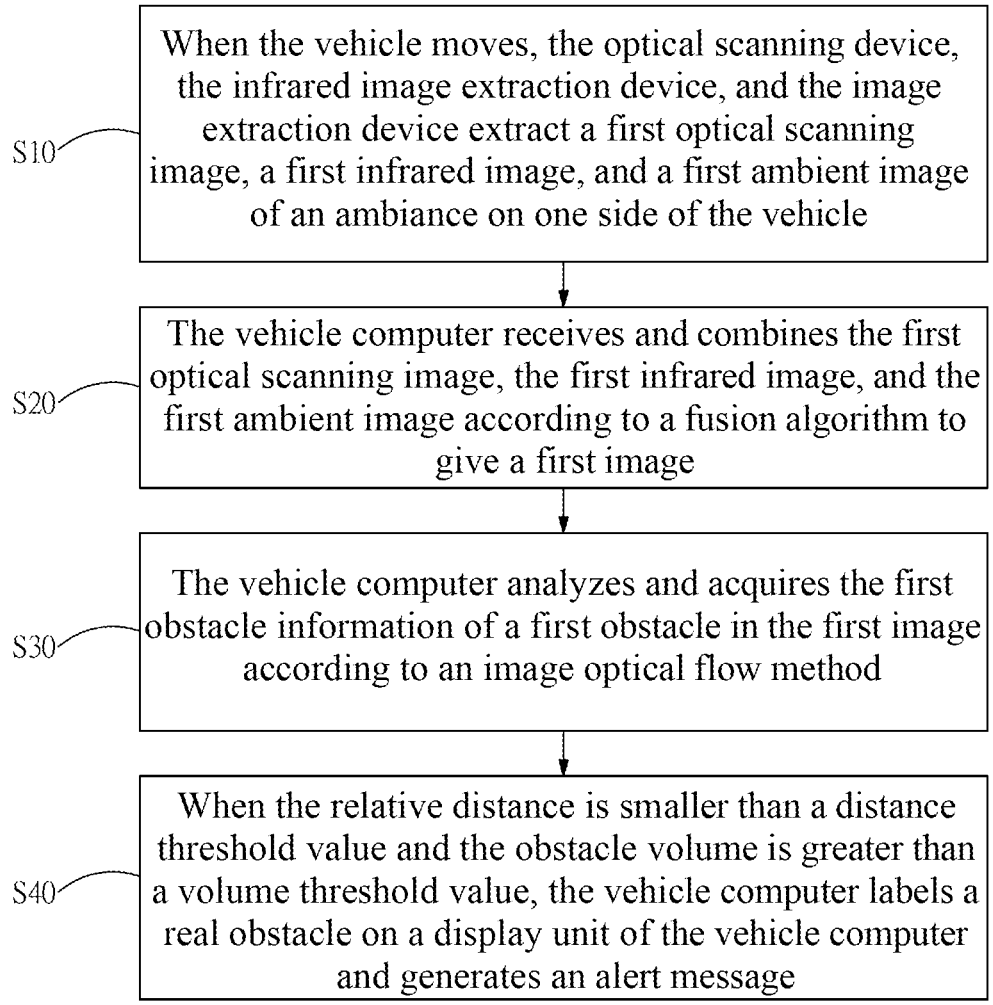
FIG. 1A shows the steps of the method of alerting to stationary objects according to an embodiment of the present invention.
Figure 2A:
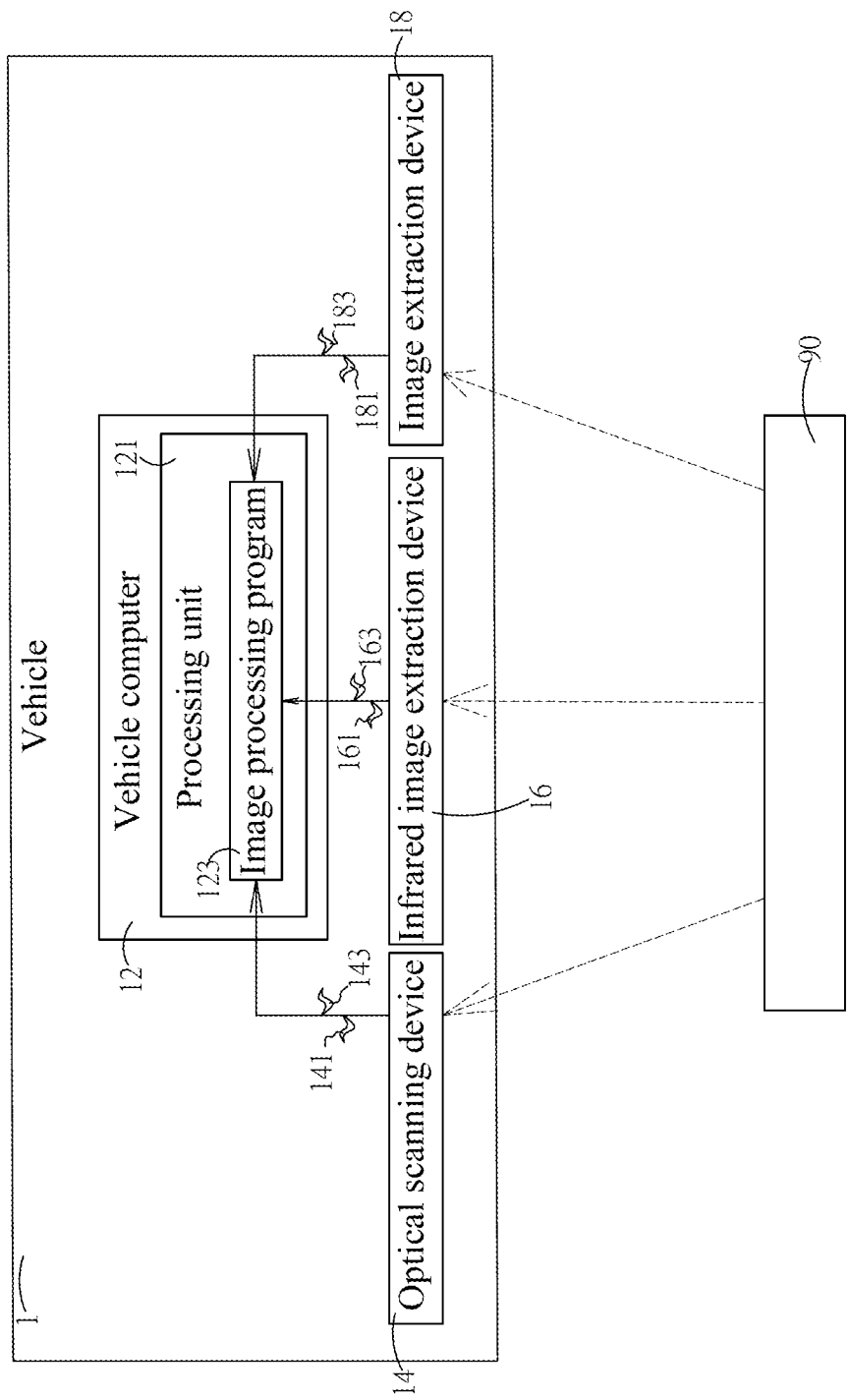
FIG. 2A shows a schematic diagram of image extraction in the method of alerting to stationary objects according to an embodiment of the present invention.

First, please refer to FIG. 1A and FIG. 2A. FIG. 1A shows the steps of the method of alerting to stationary objects according to an embodiment of the present invention; FIG. 2A shows a schematic diagram of image extraction in the method of alerting to stationary objects according to an embodiment of the present invention. As shown in the figures, the present embodiment is applied to a vehicle 1, which includes a vehicle computer 12, an optical scanning device 14, an infrared image extraction device 16, and an image extraction device 18. The vehicle computer 12 is connected electrically to the optical scanning device 14, the infrared image extraction device 16, and the image extraction device 18. The vehicle computer 12 executes the following steps:

Step S10: When the vehicle moves, the optical scanning device, the infrared image extraction device, and the image extraction device extract a first optical scanning image, a first infrared image, and a first ambient image of an ambiance on one side of the vehicle;

Step S20: The vehicle computer receives and combines the first optical scanning image, the first infrared image, and the first ambient image according to a fusion algorithm to give a first image;

Step S30: The vehicle computer analyzes and acquires the first obstacle information of a first obstacle in the first image according to an image optical flow method; and Step S40: When the relative distance is smaller than a distance threshold value and the obstacle volume is greater than a volume threshold value, the vehicle computer labels a real obstacle on a display unit of the vehicle computer and generates an alert message.

In the step S10 of the present embodiment, when the vehicle 1 moves, the optical scanning device 14, the infrared image extraction device 16, and the image extraction device 18 extract a first optical scanning image 141, a first infrared image 161, and a first ambient image 181 of an ambiance 90 on one side of the vehicle 1.

According to the present embodiment, the vehicle computer 12 is a vehicle computer including a processing unit 121. Nonetheless, it can be a server, a notebook computer, a tablet computer, or any electronic device having image processing capability. The processing unit 12 of the vehicle computer 12 executes an image processing program 123. The image processing program 123 is used for receiving the data generated by the optical scanning device 14, the infrared image extraction device 16, and the image extraction device 18 and performing subsequent image processing.

The optical scanning device 14 according to the present embodiment is a lidar or a laser scanner. The image extraction device 18 according to the present embodiment is a color image extraction unit, for example, an automotive CMOS sensor. The infrared image extraction device 16 according to the present embodiment is an infrared camera. According to the present embodiment, the reason to use the infrared image extraction device 16 is that, compared to the visible light, the near infrared is more transmissive to glass, plastics, high-polymer biological skins. Thereby, since the visible light cannot penetrate these materials, the image will appear opaque. On the contrary, for near infrared imaging, since the surface layer of objects cannot block the near infrared, the image will appear transparent. Thereby, the near infrared can penetrate and expose the image under the surface of objects. According to the present embodiment, by comparing the stereoscopic image formed by the optical scanning device 14 and the image extraction device 18 with the IR images given by the infrared image extraction device 16, a more accurate ambiance model outside a vehicle can be given.

The vehicle computer 12 according to the present embodiment is disposed in the vehicle 1. The optical scanning device 14, the infrared image extraction device 16, and the image extraction device 18 are disposed on one side of the vehicle 1. The vehicle computer 12 is connected electrically to the optical scanning device 14, the infrared image extraction device 16, and the image extraction device 18. The image extraction angle of the infrared image extraction device 16 and the image extraction device 18 is between 120 and 170 degrees for extracting the images surrounding or in front of the vehicle 1 within 200 meters, for example, but not limited to, safety islands, stationary motorcyclists, or trees.

Figure 2B:
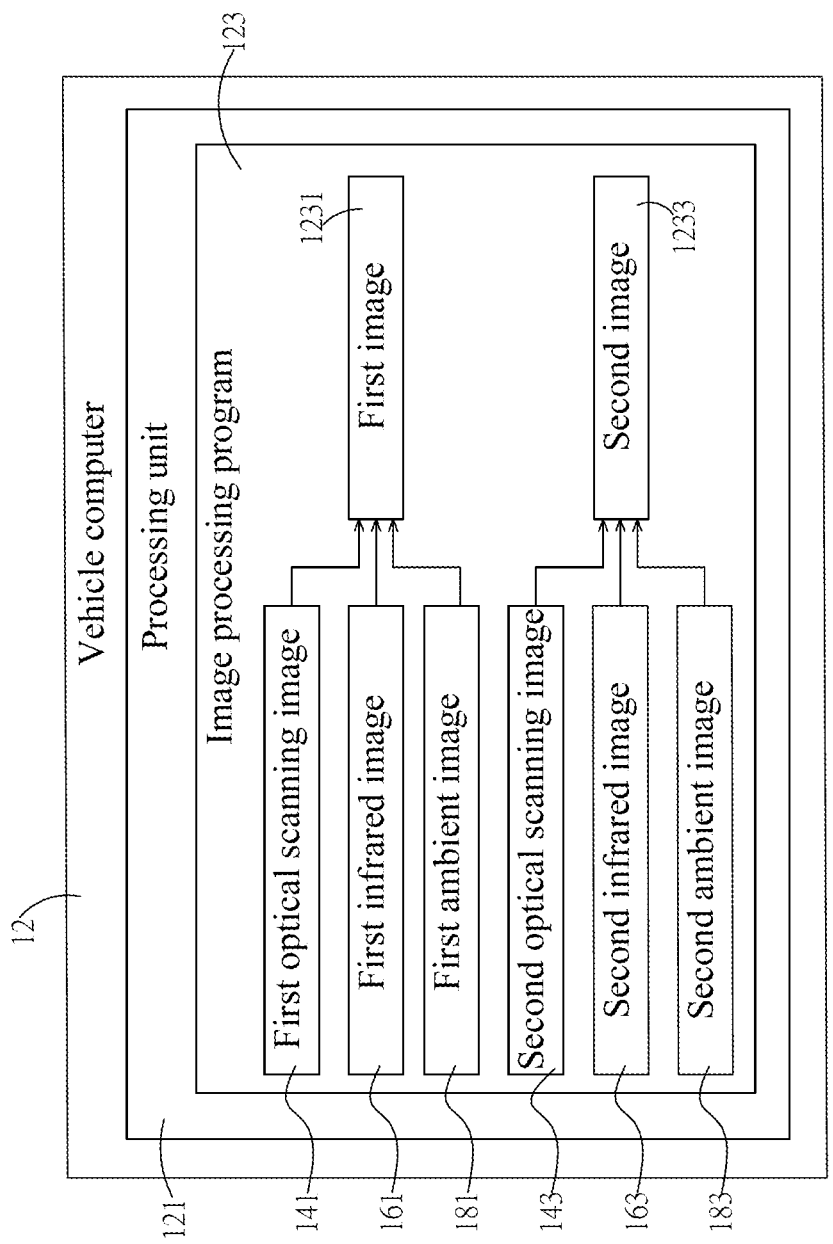
FIG. 2B shows a schematic diagram of image processing in the method of alerting to stationary objects according to an embodiment of the present invention.

Next, in the step S20 of the present embodiment, please refer to FIG. 2B, which shows a schematic diagram of image processing in the method of alerting to stationary objects according to an embodiment of the present invention. As shown in the figure, the vehicle computer 1 receives and combines the first optical scanning image 141, the first infrared image 161, and the first ambient image 181 according to a fusion algorithm to give a first image 1231.

According to the present embodiment, the fusion algorithm described above is to use a characteristic function f(x,y) as expressed in Equation (1). When x and y satisfy a certain fact, the value of the characteristic function is equal to 1.

$$f_i(x, y) \in \{0,1\}, i=1,2,\ldots,m \quad \text{Eq. (1)}$$

The corresponding hidden conditions of an observable are determined by the context (observation, state). The characteristic function is introduced for selecting the ambient characteristics (the combination of observation or state). In other words, the characteristics (the observation combination) are used to replace observation for avoiding limitation on the independence assumption for naïve bayes of the generation model HMM.

According to the training data D={(x$^{(1)}$, y$^{(1)}$), (x$^{(2)}$, y$^{(2)}$), ..., (x$^{(N)}$, y$^{(N)}$)} with magnitude T, an empirical expectation (as shown in Equation (2)) and the model expectation (as shown in Equation (3)), the learning of the maximum entropy model is equivalent to the optimization of constraints.

$$\tilde{E}(f_i) = \frac{1}{n}\sum_{x,y} p(x, y)f_i(x, y) \quad \text{Eq. (2)}$$

$$E(f_i) = \frac{1}{n}\sum_{x,y} p(x)p(y \mid x)f_i(x, y) \quad \text{Eq. (3)}$$

Assuming that the empirical expectation is equal to the model expectation, there exist multiple sets C satisfying the constraint for arbitrary characteristic function fi, as expressed in Equation (4) below:

$$C=\{P|E_p(f_i)=\tilde{E}_p(f_i), i=1,2,\ldots,m\} \quad \text{Eq. (4)}$$

The maximum entropy principle describes that the only reasonable probability distribution induced from incomplete information (for example, limited number of training data) should satisfy the maximum entropy given the constraints. Namely, the maximum entropy distribution is the optimum distribution given the limited conditions. Thereby, the maximum entropy function model becomes the constraint optimization problem for a convex function.

$$\max_{P \in C} H(P) = -\sum_{x,y} P(x)P(y \mid x)\log P(y \mid x) \quad \text{Eq. (5)}$$

$$\text{s.t. } E_p(f_i) = \tilde{E}_p(f_i), i = 1, 2, \ldots, m \quad \text{Eq. (6)}$$

$$\text{s.t. } \sum_y p(y \mid x) = 1 \quad \text{Eq. (7)}$$

Normally, the Lagrange duality principle is used to transform the original equations to solve for constraintless maximum value:

$$L(\omega, \alpha, \beta) = f(\omega) + \sum_{i=1}^{k} \alpha_i g_i(\omega) + \sum_{j=1}^{l} \beta_j h_j(\omega) \quad \text{Eq. (8)}$$

$$\Lambda(p, \hat{\lambda}) = H(y \mid x) + \sum_{i=1}^{m} \lambda_i (E_p(f_i) - \hat{E}_p(f_i)) + \lambda_{m+1}\left(\sum_{y \in Y} P(y \mid x) - 1\right) \quad \text{Eq. (9)}$$

Partially differentiate the Lagrange function with respect to p and make it equal to zero. By solving the equation, it gives:

$$p_{\hat{\lambda}}^*(y \mid x) = \frac{1}{Z_{\hat{\lambda}}(x)}\exp\left(\sum_{i=1}^{m}\lambda_i f_i(x, y)\right) \quad \text{Eq. (10)}$$

$$Z_{\hat{\lambda}}(x) = \sum_{y \in Y}\exp\left(\sum_{i=1}^{m}\lambda_i f_i(x, y)\right) \quad \text{Eq. (11)}$$

The maximum-entropy Markov model (MEMM):

$$p_{y_{i-1}}(y_i \mid x_i) = \frac{1}{Z_{\hat{\lambda}}(x_i, y_{i-1})}\exp\left(\sum_{a}\lambda_a f_a(x_i, y_i)\right),$$

$$i = 1, 2, \ldots, T \quad \text{Eq. (12)}$$

Use the P($y_i \mid y_{i-1}, x_i$) distribution to replace the two conditional probability distributions in HMM. It means the probability of reaching the current state from the previous state according to observable. In other words, the current state is given according to the previous state and the current observation. Each of the distribution function $p_{y_{i-1}}(y_i \mid x_i)$ is an exponential function with maximum entropy.

Assume that the points in the discrete probability distribution {p$_1$, p$_2$, ..., p$_n$} and the maximum information entropy are found. Find the minimum probability distribution {p$_1$, p$_2$, ..., p$_n$}. The maximum entropy equation is:

$$f(p_1,p_2,\ldots,p_n)=-\Sigma_{j=1}^{n}P_j\log_3 P_j \quad \text{Eq. (13)}$$

Because this is a probability distribution, the sum of $p_i$ at each x$_i$ must be equal to 1:

$$g(p_1, p_2, \ldots, p_n) = \sum_{j=1}^{n} p_j = 1. \quad \text{Eq. (14)}$$

Use the Lagrange multiplier to give the maximum-entropy angle. $\vec{p}$ covers {x$_1$, x$_2$, ..., x$_n$} of all discrete probability:

$$\left.\frac{\partial}{\partial \vec{p}}(f + \lambda(g-1))\right|_{\vec{p}=\vec{p}^*} = 0, \quad \text{Eq. (15)}$$

It gives a system equation Ñ with k=1, ..., n such that:

$$\left.\frac{\partial}{\partial p_k}\left\{-\left(\sum_{j=1}^{n} p_j \log_2 p_j\right) + \lambda\left(\sum_{j=1}^{n} p_j - 1\right)\right\}\right|_{p_k=p_k^*} = 0. \quad \text{Eq. (16)}$$

Expanding these ñ equations, it gives:

$$-\left(\frac{1}{\ln 2} + \log_2 p_k^*\right) + \lambda = 0. \quad \text{Eq. (17)}$$

It means that all p*$_k$ are equal because they depend on λ only. By using the following equation to confine:

$$\sum_j p_j = 1, \quad \text{Eq. (18)}$$

$$p_k^* = \frac{1}{n}.$$

It gives:

$$p_k^* = \frac{1}{n}. \quad \text{Eq. (19)}$$

Thereby, the uniform distribution is a distribution with the maximum entropy:

$$\left|\frac{\sum_{j=1}^n P_j - P_k}{\sum_{j=1}^n P_j}\right| \times 100 \quad \text{Eq. (20)}$$

By using the above Equation (20), the maximum entropy distribution will be given. As shown in FIG. 2B, in the image fusion process, the image overlap regions of the first optical scanning image 141, the first infrared image 161, and the first ambient image 181 are eliminated and generating the first image 1231.

Figure 2C:
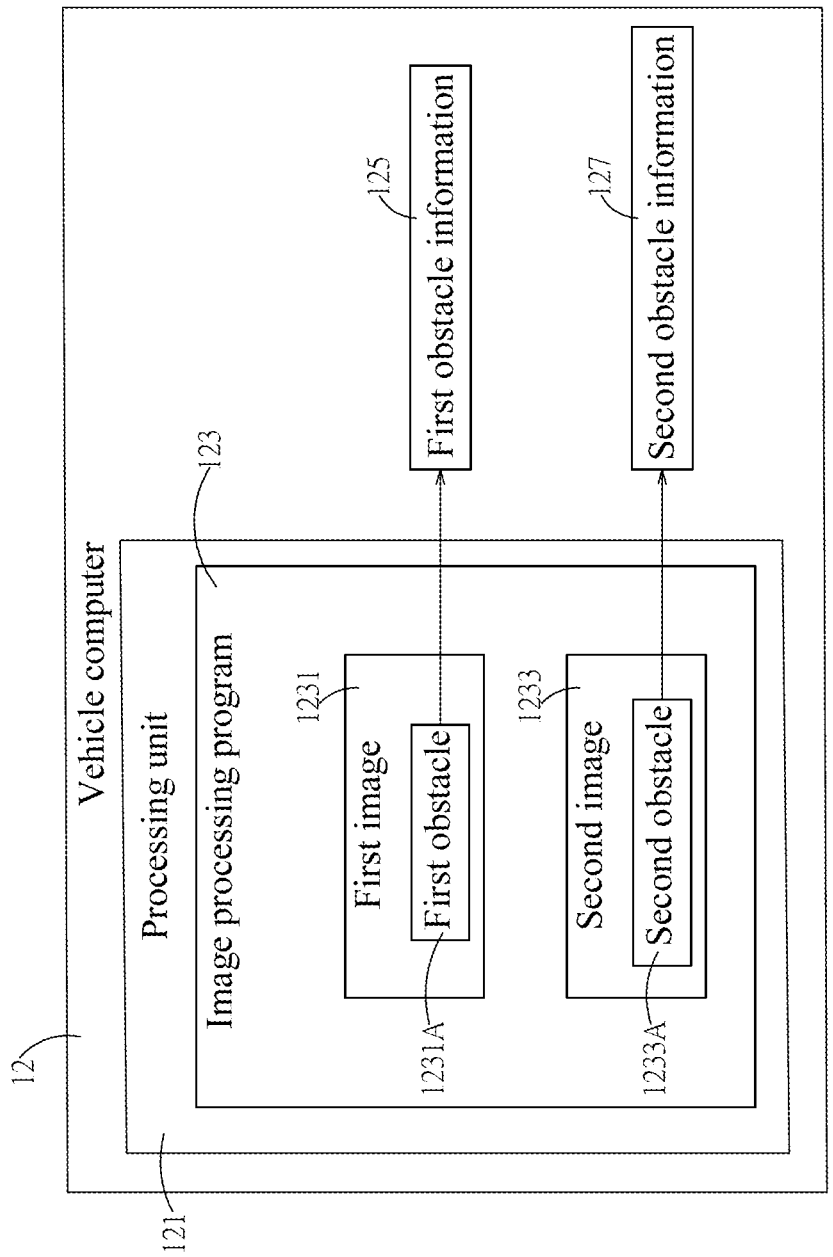
FIG. 2C shows a schematic diagram of selecting obstacles in the method of alerting to stationary objects according to an embodiment of the present invention.

Next, please refer to FIG. 2C, which shows a schematic diagram of selecting obstacles in the method of alerting to stationary objects according to an embodiment of the present invention. As shown in the figure, in the step S30 of the present embodiment, the vehicle computer 12 analyzes and acquires the first obstacle information 125 of a first obstacle 1231A in the first image 1231 according to an image optical flow method, where the first obstacle information 125 includes a relative distance 1221 to the vehicle 1 and an obstacle volume 1225 of the first obstacle 1231A.

Furthermore, whether an obstacle is stationary can be judged according to the present embodiment. Please refer again to FIGS. 2A to 2C. the optical scanning device 14, the infrared image extraction device 16, and the image extraction device 18 can further extract a second optical scanning image 143, a second infrared image 163, and a second ambient image 183 at another time. By using the previous images, the vehicle computer 12 can get a second image 1233. The vehicle computer 12 uses the optical flow method to analyze a second obstacle 1233A in the second image 1233 and gives the second obstacle information 127. The first obstacle 1231A is identical to the second obstacle 1233A. Since the vehicle 1 is moving, the difference between the first obstacle 1231A and the second obstacle 1233A is the relative distance only.

Accordingly, by using the difference between the relative distances of the first obstacle 1231A and the second obstacle 1233A and the speed of the vehicle 1, whether the first obstacle 1231 in the first image 1231 can be judged.

The above optical flow method is to use the Lucas-Kanade optical flow algorithm to calculate the location information of the first obstacle 1231A and the second obstacle 1233A.

First, the image partial differentiation method is used. Expand the constraint equation by Taylor's formula to give:

$$I(x + \delta x, y + \delta y, z + \delta z, t + \delta t) = \quad \text{Eq. (21)}$$
$$I(x, y, z, t) + \frac{\partial I}{\partial x}\delta x + \frac{\partial I}{\partial y}\delta y + \frac{\partial I}{\partial z}\delta z + \frac{\partial I}{\partial t}\delta t + H.O.T.$$

where H.O.T. stands for higher order terms and can be ignored when the displacement is small. According to the equation, it gives:

$$\frac{\partial I}{\partial x}\delta x + \frac{\partial I}{\partial y}\delta y + \frac{\partial I}{\partial z}\delta z + \frac{\partial I}{\partial t}\delta t = 0 \quad \text{Eq. (22)}$$

or $$\frac{\partial I}{\partial x}\frac{\delta x}{\delta t} + \frac{\partial I}{\partial y}\frac{\delta y}{\delta t} + \frac{\partial I}{\partial z}\frac{\delta z}{\delta t} + \frac{\partial I}{\partial t}\frac{\delta t}{\delta t} = 0 \quad \text{Eq. (23)}$$

And giving:

$$\frac{\partial I}{\partial x}V_x + \frac{\partial I}{\partial y}V_y + \frac{\partial I}{\partial z}V_z + \frac{\partial I}{\partial t} = 0 \quad \text{Eq. (24)}$$

Vx, Vy, Vz are the x, y, z components of the optical flow vector of I(x,y,z,t).

$$\frac{\partial I}{\partial x}, \frac{\partial I}{\partial y}, \frac{\partial I}{\partial z} \text{ and } \frac{\partial I}{\partial t}$$

are the partial derivatives of the image at the point (x,y,z,t) with respect to the corresponding direction. Thereby, Equation (24) can be converted to the following equation:

$$I_x V_x + I_y V_y + I_z V_z = -I_t \quad \text{Eq. (25)}$$

Further, rewrite Equation (25) as:

$$\nabla I^T \cdot V = -I_t \quad \text{Eq. (26)}$$

Since Equation (24) includes three unknowns (Vx,Vy,Vz), the subsequent algorithm will be used to solve for the unknowns.

First, assume that the optical flow (Vx, Vy,Vz) is a constant in a small cube with size m*m*m (m>1). From the voxel 1 . . . n, n=m 3, it gives the following set of equations:

$$I_{x1}V_x + I_{y1}V_y + I_{z1}V_x = -I_{t_1}$$
$$I_{x2}V_x + I_{y2}V_y + I_{z2}V_x = -I_{t_2}$$
$$I_{xn}V_x + I_{yn}V_y + I_{zn}V_x = -I_{t_n} \quad \text{Eq. (27)}$$

The above equation all include three unknowns and form an overdetermined equation set. In other words, there are redundancy in the equations. The equation set can be expressed as:

$$\begin{bmatrix} I_{x1} & I_{y1} & I_{z1} \\ I_{x2} & I_{y2} & I_{z2} \\ \vdots & \vdots & \vdots \\ I_{x_n} & I_{y_n} & I_{z_n} \end{bmatrix} \begin{bmatrix} V_x \\ V_y \\ V_z \end{bmatrix} = \begin{bmatrix} -I_{t_1} \\ -I_{t_2} \\ \vdots \\ -I_{t_n} \end{bmatrix} \quad \text{Eq. (28)}$$

Denote:

$$A\vec{v}=-b \qquad \text{Eq. (29)}$$

To solve the redundancy problem of the overdetermined equations, Equation (29) adopts the least squares method to give:

$$A^T A \vec{v}=A^T(-b) \qquad \text{Eq. (30)}$$

or $$\vec{v}=(A^T A)^{-1} A^T(-b) \qquad \text{Eq. (31)}$$

Then we get:

$$\begin{bmatrix} V_x \\ V_y \\ V_z \end{bmatrix} = \begin{bmatrix} \sum I_{x_i}^2 & \sum I_{x_i} I_{y_i} & \sum I_{x_i} I_{z_i} \\ \sum I_{x_i} I_{y_i} & \sum I_{y_i}^2 & \sum I_{y_i} I_{z_i} \\ \sum I_{x_i} I_{z_i} & \sum I_{y_i} I_{z_i} & \sum I_{z_i}^2 \end{bmatrix}^{-1} \begin{bmatrix} -\sum I_{x_i} I_{t_i} \\ -\sum I_{y_i} I_{t_i} \\ -\sum I_{z_i} I_{t_i} \end{bmatrix} \qquad \text{Eq. (32)}$$

Substitute the result of Equation (32) into Equation (24), the first obstacle information 125 of the first obstacle 1231A and the second obstacle information 127 of the second obstacle 1233A can be estimated. By using the first obstacle information 125 and the second obstacle information 127, the relative distance 1221 between the first obstacle 1231A and the vehicle 1 can be given.

Figure 2D:
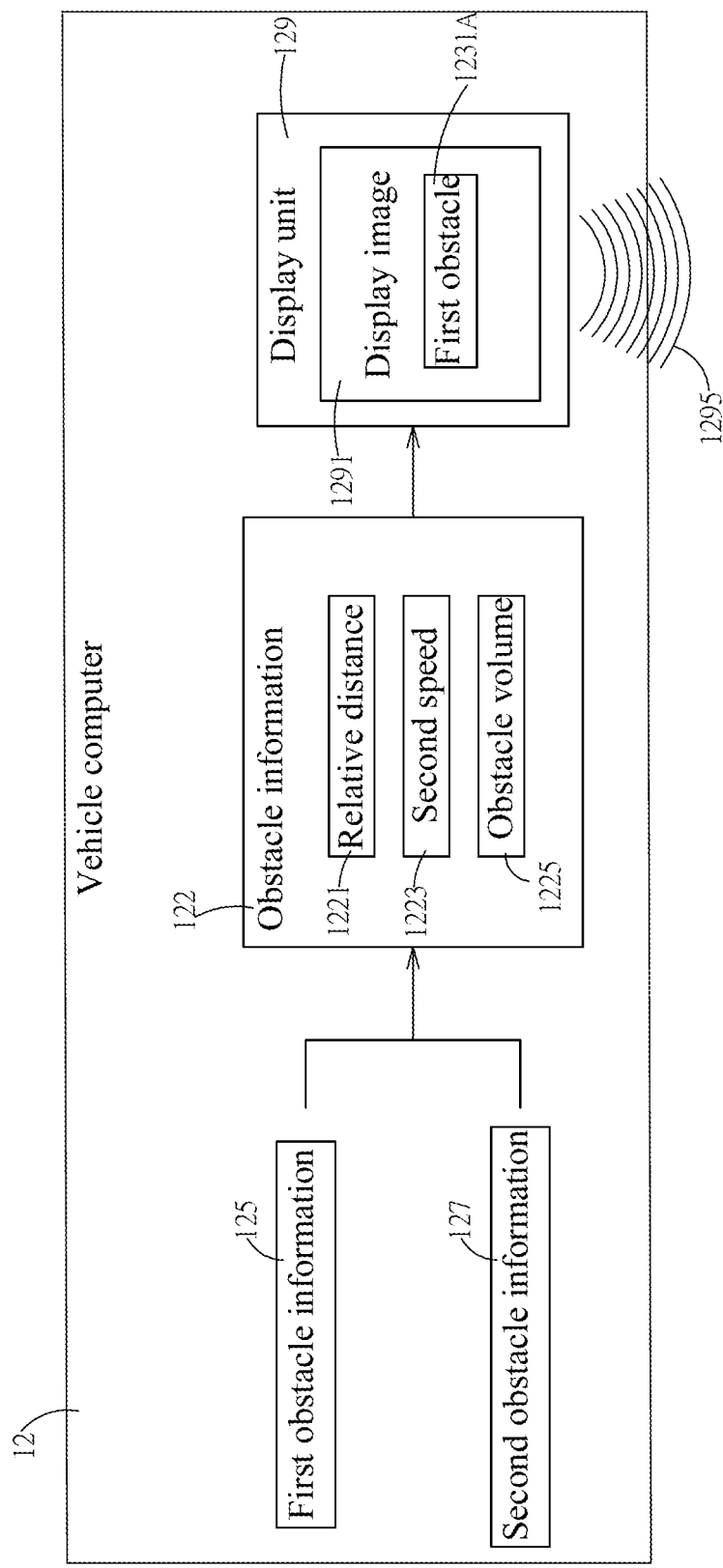
FIG. 2D shows a schematic diagram of real obstacle alert in the method of alerting to stationary objects according to an embodiment of the present invention.

Finally, please refer to FIG. 2D, which shows a schematic diagram of real obstacle alert in the method of alerting to stationary objects according to an embodiment of the present invention. As shown in the figure, in the step S40 of the present embodiment, when the relative distance 1221 of the first obstacle 1231A is smaller than a distance threshold value and the obstacle volume 1225 is greater than a volume threshold value, the vehicle computer 12 labels the first obstacle 1231A on a display image 1291 of a display unit 129 of the vehicle computer 12 and generates an alert message 1295.

Figure 1B:
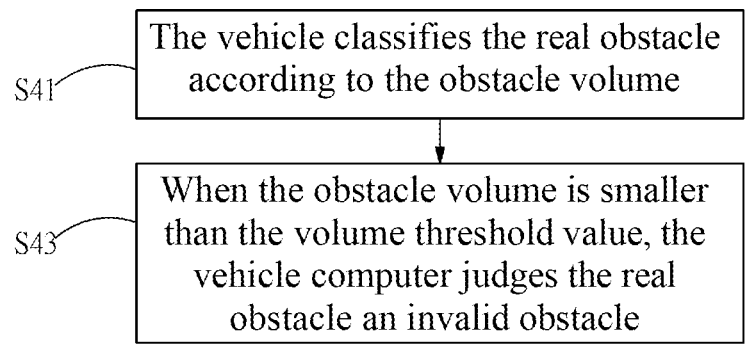
FIG. 1B shows the step of judging an invalid obstacle according to an embodiment of the present invention.

In the step S40, please refer to FIG. 1B, which shows the step of judging an invalid obstacle according to an embodiment of the present invention. As shown in the figure, the step further includes the following steps:

Step S41: The vehicle classifies the real obstacle according to the obstacle volume; and Step S43: When the obstacle volume is smaller than the volume threshold value, the vehicle computer judges the real obstacle an invalid obstacle.

In the steps S41 to S43, the vehicle computer 12 will classify the first obstacle 1231A. When the volume of the first obstacle 1231A is smaller than the volume threshold value, the vehicle computer 12 judges that the first obstacle 1231A an invalid obstacle. When the first obstacle 1231A is an invalid obstacle, the vehicle computer 12 will not list the first obstacle 1231A as the target to be noticed.

In the step 40, the alert message 1295 is a voice message or/and an image message. The distance threshold value is 200 meters. The speed threshold value is smaller than or equal to zero. The volume threshold value is 400 square centimeters.

For example, the alert message can be displaying the first obstacle 1231A on the display unit 129. Furthermore, an alarm sound can be included.

In other words, when the distance between the first obstacle 1231A and the vehicle 1 is smaller than 200 meters, the alert message 1295 will label the first obstacle 1231A on the display unit 129 of the vehicle computer 12.

If the distance is smaller than 100 meters, in addition to labeling the first obstacle 1231A on the display unit 129 of the vehicle computer 12, the alert message 1295 will further provide an alarm sound (for example, a short beep) for reminding the driver of the vehicle 1.

Furthermore, if the distance between the first obstacle 1231A and the vehicle 1 is smaller than 50 meters, in addition to labeling the first obstacle 1231A on the display unit 129 of the vehicle computer 12, the vehicle computer 12 will also provide intermittent alarm sound (for example, beep, beep, beep, beep).

Finally, if the distance between the first obstacle 1231A and the vehicle 1 is smaller than 50 meters, in addition to labeling the first obstacle 1231A on the display unit 129 of the vehicle computer 12, the vehicle computer 12 will emit continuous alarm sound (for example, 4 continuous beeps) for reminding the driver.

The advantage of the present embodiment is to make use of the three-dimensional ambient information within 200 meters surrounding the vehicle 1 by using lidar (the optical scanning device 14, the infrared image extraction device 16, and the image extraction device 18). By using the 3D ambient information, the dynamic behaviors of various objects within 200 meters of the vehicle 1, as well as their speed, acceleration, size, and direction, can be acquired in advance so that the driver can avoid them, In addition, within 10 meters, images and depth information are further provided for acquiring omnidirectional information and more accurate ambient model outside the vehicle 1.

As illustrated in the previous embodiments, the present invention provides a method of alerting to stationary objects for vehicle. The method scans the objects on one side of a vehicle to acquire the corresponding object images and filter the object images to get the filtered images that influences the vehicle. According to the speeds of the corresponding objects and the vehicle and the distances therebetween, the method generates an alert message to the user so that the user can do precautions in advance for avoiding danger.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A method of alerting to stationary objects for vehicle, applicable to a vehicle, said vehicle including a vehicle computer, a optical scanning device, an infrared image extraction device, and an image extraction device, said vehicle computer connected electrically to said optical scanning device, said infrared image extraction device, and said image extraction device, and said vehicle computer executing the following steps of:

when said vehicle moves, said optical scanning device, said infrared image extraction device, and said image extraction device extracting a first optical scanning image, a first infrared image, and a first ambient image of an ambiance on one side of said vehicle;

said vehicle computer receiving and combining said first optical scanning image, said first infrared image, and said first ambient image according to a fusion algorithm to give a first image;

said vehicle computer analyzing and acquiring said first obstacle information of a first obstacle in said first image according to an image optical flow method, where said first obstacle information includes a relative distance to said vehicle and an obstacle volume of said first obstacle; and when said relative distance is smaller than a distance threshold value and said obstacle volume is greater than a volume threshold value, said vehicle computer labeling a real obstacle on a display unit of said vehicle computer and generating an alert message.

2. The method of alerting to stationary objects for vehicle of claim 1, where in said step of said vehicle computer receiving and combining said first optical scanning image, said first infrared image, and said first ambient image according to a fusion algorithm to give a first image, said vehicle computer includes a processing unit; said processing unit includes an image processing program; and said image processing program is used for executing said fusion algorithm and said image optical flow method.

3. The method of alerting to stationary objects for vehicle of claim 1, where in said step of said vehicle computer analyzing and acquiring said first obstacle information of a first obstacle in said first image according to an image optical flow method, where said first obstacle information includes a relative distance to said vehicle and an obstacle volume of said first obstacle in said first image, the vehicle computer further executes the steps of:

said vehicle classifying said real obstacle according to said obstacle volume; and when said obstacle volume is smaller than said volume threshold value, said vehicle computer judging said real obstacle an invalid obstacle.

4. The method of alerting to stationary objects for vehicle of claim 1, where said alert message is a voice message or/and an image message.

5. The method of alerting to stationary objects for vehicle of claim 1, where in said step of when said relative distance is smaller than a distance threshold value and said obstacle volume is greater than a volume threshold value, said vehicle computer labeling a real obstacle on a display unit of said vehicle computer and generating an alert message, said volume threshold value is smaller than 400 square centimeters.

6. The method of alerting to stationary objects for vehicle of claim 1, where in said step of when said relative distance is smaller than a distance threshold value and said obstacle volume is greater than a volume threshold value, said vehicle computer labeling a real obstacle on a display unit of said vehicle computer and generating an alert message, said distance threshold value is smaller than 200 meters.

* * * * *